US011358841B2

(12) United States Patent
Moll et al.

(10) Patent No.: US 11,358,841 B2
(45) Date of Patent: Jun. 14, 2022

(54) SHUTDOWN BUFFER FOR A LIFTING DEVICE, IN PARTICULAR CHAIN HOIST, AND LIFTING DEVICE HEREWITH

(71) Applicant: Konecranes Global Corporation, Hyvinkää (FI)

(72) Inventors: Oliver Moll, Solingen (DE); Torsten Sattler, Sprockhövel (DE)

(73) Assignee: Konecranes Global Corporation, Hyvinkää (FI)

( * ) Notice: Subject to any disclaimer, the term of this patent is extended or adjusted under 35 U.S.C. 154(b) by 106 days.

(21) Appl. No.: 16/671,163

(22) Filed: Oct. 31, 2019

(65) Prior Publication Data

US 2020/0331731 A1 Oct. 22, 2020

(30) Foreign Application Priority Data

Apr. 18, 2019 (DE) ......................... 202019102262.0

(51) Int. Cl.
*B66D 3/26* (2006.01)
*B66D 3/20* (2006.01)
*B66D 3/24* (2006.01)

(52) U.S. Cl.
CPC ................. *B66D 3/26* (2013.01); *B66D 3/20* (2013.01); *B66D 3/24* (2013.01)

(58) Field of Classification Search
CPC ... B66D 3/18; B66D 3/20; B66D 3/24; B66D 3/26; B66C 1/34; F16C 11/12; F16F 1/16; F16F 1/26
USPC ........ 248/567, 590, 619; 267/103, 110, 158, 267/160, 161
See application file for complete search history.

(56) References Cited

U.S. PATENT DOCUMENTS

| | | | | | |
|---|---|---|---|---|---|
| 2,428,578 | A * | 10/1947 | Nelles | B66D 1/56 254/269 |
| 2,681,954 | A * | 6/1954 | Mayer | B66D 3/24 200/47 |
| 3,250,563 | A * | 5/1966 | Walsh | B66C 1/34 294/82.16 |
| 3,318,575 | A * | 5/1967 | Hawkins | B66C 1/34 294/82.16 |
| 4,398,387 | A * | 8/1983 | Bary | B66D 3/16 254/371 |
| 4,948,098 | A * | 8/1990 | Nishimura | B66D 3/14 254/372 |
| 6,431,102 | B1 * | 8/2002 | Askestad | B63B 21/14 114/200 |
| 8,451,612 | B2 * | 5/2013 | Lester | B66C 13/14 361/729 |
| 2002/0014731 | A1 | 2/2002 | Palinkas | |

* cited by examiner

FOREIGN PATENT DOCUMENTS

| | | | | |
|---|---|---|---|---|
| DE | 10014913 | | 10/2001 | |
| DE | 102019132345 | A1 * | 7/2020 | F16F 1/377 |
| GB | 731145 | A * | 6/1955 | B66D 3/24 |

*Primary Examiner* — Sang K Kim
*Assistant Examiner* — Nathaniel L Adams
(74) *Attorney, Agent, or Firm* — Gardner, Linn, Burkhart & Ondersma LLP

(57) ABSTRACT

A shut-down buffer for a lifting device, in particular a chain hoist, includes two opposing end surfaces and at least two mutually spaced web elements extending between the end surfaces. The shut-down buffer is defined by the end surfaces, between which a through-opening for passage of a load-bearing element of the lifting device extends through the shut-down buffer.

14 Claims, 6 Drawing Sheets

SHUTDOWN BUFFER FOR A LIFTING DEVICE, IN PARTICULAR CHAIN HOIST, AND LIFTING DEVICE HEREWITH

RELATED APPLICATIONS

The present application claims priority from German Patent Application No. DE 20 2019 102 262.0, filed on Apr. 18, 2019, which is hereby incorporated herein by reference in its entirety.

FIELD OF THE INVENTION

The invention relates to a shut-down buffer for a lifting device, in particular a chain hoist.

BACKGROUND OF THE INVENTION

Lifting devices such as cable winches or chain hoists serve for the motorised lifting and lowering of loads by means of load hooks fastened to load-bearing means such as cables or chains. The load hook is usually rotatably received and mounted in a holding part. The respective load-bearing means is connected to the holding part. In the case of a multi-strand embodiment of the lifting device the holding part is a part of a lower block in which one or a plurality of deflecting rollers for cables or deflecting wheels, such as e.g. pocket wheels for chains, are rotatably mounted, about which the respective load-bearing means is deflected.

The raising and lowering of the load hook is usually controlled by manual actuation of a switching element for the drive motor of the lifting device. It is necessary, at the position of maximum lifting height (upper end position of the load hook), to provide a shut-down device with an end switch, which shuts down the lifting device, e.g. even if the operator is inattentive, in order to protect this lifting device from overload and therefore damage and/or to prevent possible falling of the load hook together with its load. In a similar manner an end switch of the shut-down device can be actuated even when the load hook is lowered to the maximum (lower end position of the load hook) in order to shut down the lifting device.

For this purpose, in relation to chain hoists, it is known, e.g. from DE 100 14 913 A1, to dispose a shut-down buffer in the form of an annular body of elastic synthetic material on the holding part for the load hook in order to actuate the end switch. When the upper end position of the load hook is reached and the end switch is thereby actuated by the shut-down buffer and the drive motor is shut down, the drive motor continues to run for a few revolutions. By reason of the delay in the shut-down of the drive motor caused by the shut-down buffer and the after-running thereof the shut-down buffer must absorb the residual travel, also referred to as after-running travel, of the after-running movement effected by the holding part and the load hook. By means of the shut-down buffer the loading of the lifting device, of the load-bearing means or of the transmission during the after-running movement is reduced. However, if shut-down fails there is a risk of the shut-down buffer being entirely compressed and thereby damaged.

SUMMARY OF THE INVENTION

The present invention provides an improved shut-down buffer for a lifting device and a lifting device with such a shut-down buffer, which is particularly robust and has a long service life and also reliably reduces or removes the loading of the lifting device, of the load-bearing means or of the transmission during after-running. An improvement in a shut-down buffer for a lifting device, in particular a chain hoist, which is defined in the direction of its central axis by two opposing end surfaces, between which a through-opening for passage of a load-bearing means of the lifting device extends through the shut-down buffer, is achieved in accordance with the invention in that at least two, preferably four, mutually spaced web elements extended between the end surfaces. A different number of web elements is naturally also feasible. The end surfaces extend, at least when the shut-down buffer is in the unloaded state, preferably in a planar manner and at a right angle to the central axis of the shut-down buffer. The web elements are in particular disposed around the through-opening and preferably uniformly spaced apart from each other.

The residual travel in the case of an after-running movement occurring as described above, which takes place in the pulling direction of a load-bearing means guided through the through-opening along the central axis of the shut-down buffer, is advantageously absorbed by a reversible deformation of the web elements which are formed to be flexible for this purpose. In this way a particular robustness and a long service life for the shut-down buffer are achieved.

At least the web elements are preferably elastically deformable for this purpose, whereby the shut-down buffer acts as a spring element which preferably has diminishing spring force characteristics. In this way, the shut-down buffer can reliably actuate an end switch of a shut-down device with a high level of force and then, with lower force, be strongly squeezed together, i.e. be compressed. The associated spring travel, which the end surfaces effect one after another along the central axis, results from the reversible deformation and in particular the flexing of the web elements. The deformation or flexing of the web elements takes place in particular by intentional bulging or buckling of the web elements, which are preferably flat in form for this purpose, when the shut-down buffer is sufficiently loaded in the direction of its central axis. This can be the case, for example, because it is pressed by the after-running movement against the housing of the lifting device or the end switch of the shut-down device at that location. The deformation, in particular bulging or buckling, then takes places to the side and transversely in relation to a main surface of the respective web element which is planar when the shut-down buffer is in the unloaded state.

The preferably planar end surfaces, which are oppositely located in relation to the central axis of the shut-down buffer in the axial direction, are formed by two end parts of the shut-down buffer which are connected to each other and spaced apart from each other by the web elements. Further connection elements between the end parts are not required and can be omitted. The end parts can be planar and flat and have in particular a round or circular outer contour along their periphery.

In order to form the through-opening the end parts each have an opening and therefore each intrinsically form an annular element. The openings of the end parts and the through-opening are preferably disposed centrally on the shut-down buffer so that the central axis of the shut-down buffer extends through the central point of the respective opening. The shut-down buffer as a whole thus forms an annular body or annular structure.

Furthermore, the shut-down buffer, in particular including its end parts and web elements, is preferably formed as one piece. At least the web elements and preferably the whole shut-down buffer is additionally produced from an elastic material, preferably a synthetic material such as e.g. polyurethane, whereby the robustness and long service life of the shut-down buffer are further increased. The entire shut-down buffer can easily be produced e.g. by means of a synthetic material injection moulding process.

Furthermore, provision is made that, between its unloaded state and a loaded state, the shut-down buffer permits spring travel in its axial direction, i.e. along its central axis, which spring travel corresponds at least to the after-running travel of the load-bearing means and preferably includes a safety margin. Under corresponding loading, in particular the end parts or the associated end surfaces effect the respective spring travel, whereby these parts/surfaces come closer to each other. The loading is induced by the after-running movement of a load-bearing means passed through the through-opening of the shut-down buffer and a force thereby acting in the pulling direction of said load-bearing means. When the load hook is located between the upper and lower end positions, the shut-down buffer is in the unloaded and undeformed state. In contrast, the shut-down buffer is in the loaded and deformed state as soon as one of the end positions is reached, and actuation of the shut-down device by the shut-down buffer thereby takes place. During the subsequent after-running movement, the loading and therefore the effected spring travel of the shut-down buffer increases in a corresponding manner.

In a particularly advantageous manner provision can be made that, when the shut-down buffer is in the unloaded state, the web elements each extend at least in sections radially in relation to a central axis of the shut-down buffer which extends within the through-opening, and thus extend parallel to the central axis and spaced apart therefrom. In other words, the flat web elements are thus oriented in such a way that the preferably rectangular main surface of the respective web element extends radially in a corresponding manner in the unloaded state and lies in a notional plane including the central axis, which plane in turn extends at a right angle to the planar end surfaces of the shut-down buffer. In the case of a uniform arrangement of the web elements around the through-opening, the respective neighbouring web elements form equal angles with respect to the central axis. Furthermore, the web elements extend between the through-opening and an outer contour of the shut-down buffer, preferably also in each case as far as adjoining the outer contour and/or through-opening. The outer contour is preferably defined by a notional envelope enclosing the end surfaces of the shut-down buffer, which envelope is in the shape of a circular cylinder when the end parts or end surfaces are circular. In this way, a rib-like arrangement of the web elements is produced between the end surfaces.

In a constructionally simple manner, provision can be made that the end surfaces of a respective end part of the shut-down buffer are formed which are connected to each other spaced apart from each other by the web elements. The respective web element is connected with its main surface at least to one, preferably to both, of the end parts via an attachment region which forms a desired flexing point for the axial loading occurring in conjunction with the after-running movement.

In order to form such a desired flexing point, e.g. the web element can be connected to the end part in the attachment region laterally offset with respect to the main surface. In other words, the connection of the web element to the end part can then therefore take place in each attachment region in a parallel and offset manner with respect to the main surface plane, i.e. the plane of extension of the respective main surface. When the shut-down buffer is oriented with its central axis and therefore also the main surface planes of the web elements vertical, there is therefore a horizontal offset of the corresponding attachment of the then vertical web element to the respective end part.

The attachment region, which is short compared to the length of the main surface, and therefore the slight offset—to the side or in parallel with the main surface plane—of such a desired flexing point it is thereby preferably achieved that the web element in the respective attachment region extends out of the main surface plane and preferably in a curved manner, which extension can be e.g. in the form of a section of an arc of a circle and preferably in the form of a quarter of a circle. When the respective web element is connected to both end parts via an attachment region with a corresponding lateral or parallel offset, the offset is preferably provided to the same side of the main surface.

By means of the offset attachment—achieved by means of the attachment regions—of the web elements to the end parts the intentional lateral bulging or buckling of the respective web element opposite to the direction of the offset, i.e. to the opposite side of the main surface, is facilitated in terms of a desired flexing point. An essential reason for this is that by means of a force, which in the initially unloaded state of the shut-down buffer as a result of the after-running movement acts in the direction of the central axis and therefore also in the case of each web element acts in the direction of the plane of extension of the respective main surface, a flexing moment with respect to the respective main surface plane is introduced through the laterally or parallel offset attachment region, whereby then the intentional bulging or buckling thereof is achieved. Each laterally offset attachment region between the main surface of a web element and an end part therefore constitutes a corresponding desired flexing point.

According to a further advantageous embodiment of the shut-down buffer provision can be made that the end surfaces each define an opening with a cross-section which corresponds to the geometry of the load-bearing means of the lifting device. In this way, in the case of a multi-strand embodiment of the lifting device, the shut-down buffer can assume a guiding and disentangling function for the load-bearing means running through. The through-opening can also have a cross-section corresponding to the load-bearing means geometry or the load-bearing means cross-section and be defined in particular by the web elements and the radial extension thereof in the direction of the central axis. When the lifting device is a chain hoist, and the load-bearing means is therefore a chain, provision can be made accordingly that at least the end surfaces formed by the end parts, have a cruciform cross-section corresponding to the chain geometry as seen in the direction of the central axis.

In a constructionally simple manner, material can be saved during the production of the shut-down buffer in that, between its end parts defining the end surfaces and the respectively adjacent web elements, the shut-down buffer is partially open, in particular as far as the through-opening. The through-opening can be defined, at least in sections along its cross-sectional periphery, by the web elements and the radial extension thereof in the direction of the central axis corresponding to the main surface thickness of the web elements. Apart from that, the through-opening between the web elements remains accessible from outside the shut-down buffer in the radial direction.

A lifting device, in particular a chain hoist, with a shut-down device for a drive motor of the lifting device, can advantageously be improved in that the lifting device for actuation of the shut-down device comprises at least one shut-down buffer according to the present invention, through the through-opening of which the load-bearing means of the lifting device is passed. The shut-down buffer then delivers the required actuating force for the shut-down device as required. The shut-down buffer has no load-bearing function. Instead, it serves to balance out the after-running movement and shut-down of the drive motor. The advantages mentioned in relation to the shut-down buffer act in a similar manner in this case, for which reason, in order to avoid repetition, reference is made to the corresponding embodiments relating to the shut-down buffer.

The shut-down buffer can be disposed lying on the upper side—facing in the pulling direction of the lifting device—of a holding part for the load hook of the lifting device and can be supported thereon in particular during actuation of the shut-down device or of an associated end switch. This applies both for single-strand and also multi-strand lifting devices.

In the single-strand embodiment, the load-bearing means of the lifting device is passed, for the purpose of load-bearing fastening of the load-bearing means end, which can be raised and lowered, to the holding part, through the through-opening of the shut-down buffer. In the case of two-strand or multi-strand lifting devices, the holding part can be a part of a lower block which, for the purpose of load-bearing fastening to the load-bearing means, comprises a deflecting roller or a deflecting wheel for the load-bearing means which runs through the holding part and is thus deflected. Then at least one strand of the load-bearing means is passed through the shut-down buffer and runs through same during lifting and lowering.

The arrangement of two shut-down buffers can also be particularly advantageous, one of which is disposed in each case on one of the two load-bearing means ends, in particular chain ends. In this way, the shut-down device or the respective end switches thereof can be actuated both upon reaching an upper end position and also upon reaching a lower end position of the load hook of the lifting device.

A shut-down buffer can additionally be disposed between the holding part and a housing of the lifting device in such a way that contact between the holding part and the housing is avoided in particular upon actuation of the shut-down device when the load hook is in the upper end position.

The invention will be described in more detail hereinunder with the aid of an exemplified embodiment and by reference to the drawings.

BRIEF DESCRIPTION OF THE DRAWINGS

FIGS. 2-5 show schematic views of the shut-down buffer in an unloaded and undeformed state;

DESCRIPTION OF PREFERRED EMBODIMENTS

Figure 1:
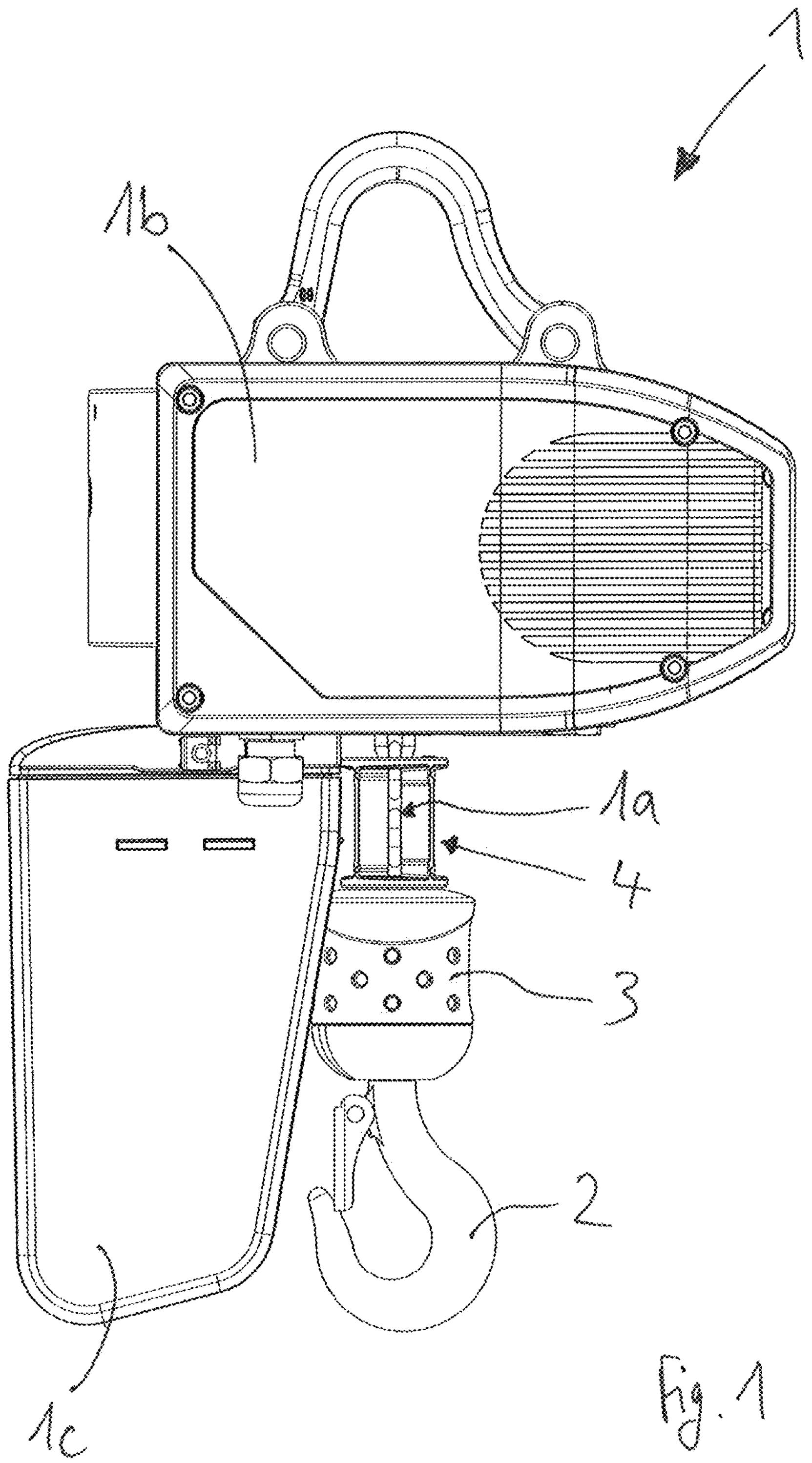
FIGS. 1 and 2 each show a schematic view of a lifting device, formed by way of example as a chain hoist, with a shut-down buffer.

FIG. 1 shows a lifting device formed as a chain hoist 1 for lifting and lowering loads. The chain hoist 1 essentially comprises a housing 1*b* for receiving a motorised drive unit with a preferably electric drive motor, a transmission and an output shaft on which a chain wheel is mounted in particular for conjoint rotation therewith and can rotate jointly with the output shaft. The chain wheel can be connected to the output shaft, e.g. by means of toothing. Furthermore, the chain hoist 1 comprises a load-bearing means or element in the form of a chain 1*a* for the indirect pick-up of the load to be moved. The chain wheel and the chain 1*a* are in form-fitting engagement with each other. By means of the form-fitting arrangement a lifting force resulting from the drive-side torque transmitted by the transmission is introduced into the chain 1*a*. The chain 1*a* is connected at one of its ends, which can be raised and lowered and is on the load side as seen from the chain wheel, to a freely suspended load picking-up means in the form of a load hook 2. The other chain end can be fastened to the housing 1*b* and, together with an unloaded part of the chain 1*a*, be located in a container-like chain store 1*c* fastened to the housing 1*b*, which chain store receives and releases the chain 1*a* via an opening depending on the direction of rotation of the chain wheel. Furthermore, a guide can be provided in the region of the chain wheel in order to prevent catching or jamming of the chain 1*a* or of individual chain links between the chain wheel and chain store 1*c*.

FIG. 1 also shows a holding part 3 on which the load hook 2 is rotatably mounted and fastened. A shut-down buffer 4 is disposed on an upper side of the holding part 3 opposite the load hook 2 and facing the housing 1*b*, which shut-down buffer lies on the upper side of the holding part 3 and has the chain 1*a* passed through its through-opening 4*d* (see FIG. 3) to the holding part 3. By means of the shut-down buffer 4 a shut-down device for the drive motor of the chain hoist 1 is actuated, the at least one end switch 5 of which (see FIG. 2) is disposed on the lower side of the chain hoist 1 or the housing 1*b* thereof and/or at the exit of the chain store 1*c*. The shut-down buffer 4 is formed as one piece and produced from an elastic material, preferably a synthetic material such as e.g. polyurethane.

In the illustrated exemplified embodiment of the single-strand chain hoist 1, the chain 1*a* passed through the through-opening 4*d* of the shut-down buffer 4 is fastened to the holding part 3 with its free end which can be raised and lowered. Load forces induced by a load are passed from the load hook 2 to the holding part 3 and from there to the chain 1*a*. Therefore, the shut-down buffer 4 has no load-bearing function. Instead, it serves only to balance out the after-running movement and shut-down of the drive motor. Furthermore, the shut-down buffer 4 is disposed by this arrangement between the holding part 3 and a housing 1*b* of the chain hoist 1 so that contact between the holding part 3 and the housing 1*b* is avoided upon actuation of the shut-down device when the load hook 2 is in the upper end position.

Figure 2:
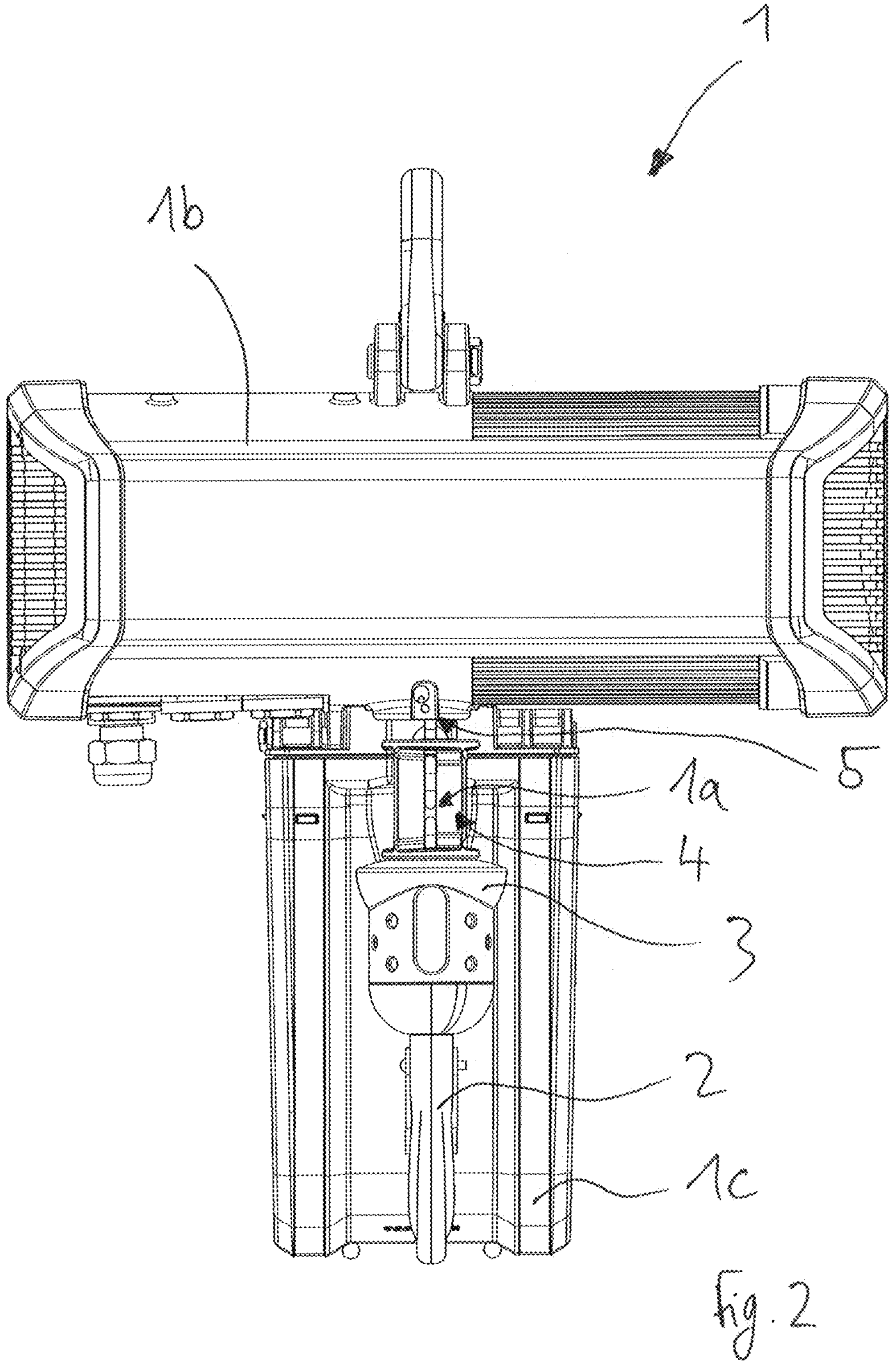

Although the illustrated embodiment of FIGS. 1 and 2 depicts the use of the shut-down buffer 4 disposed on an upper side of the holding part 3, above the load hook 2 and on the loaded part of the chain 1*a*, it will be appreciated that the shut-down buffer 4 may be attached at the unloaded part of the chain 1*a*, instead of (or in addition to) the shut-down buffer 4 on the loaded part of the chain 1*a*. This other shut-down buffer would be typically contained in the chain store 1*c* except to the extent that once a maximum amount of chain 1*a* has been payed out, with the load hook 2 in the lower end position, the other shut-down buffer is drawn up to the housing 1*b* where it contacts another end switch located at or near the housing 1*b* where the chain store 1*c* is attached. Thus, the shut-down buffer 4 can be used along the "dead" (unloaded) end of the chain 1*a*, or along the loaded end of the chain 1*a* above the load hook 2, or two shut-down buffers 4 provided such that one shut-down buffer is at each end region of the chain to trigger separate upper and lower end switches at each desired end of chain travel.

Figure 7:
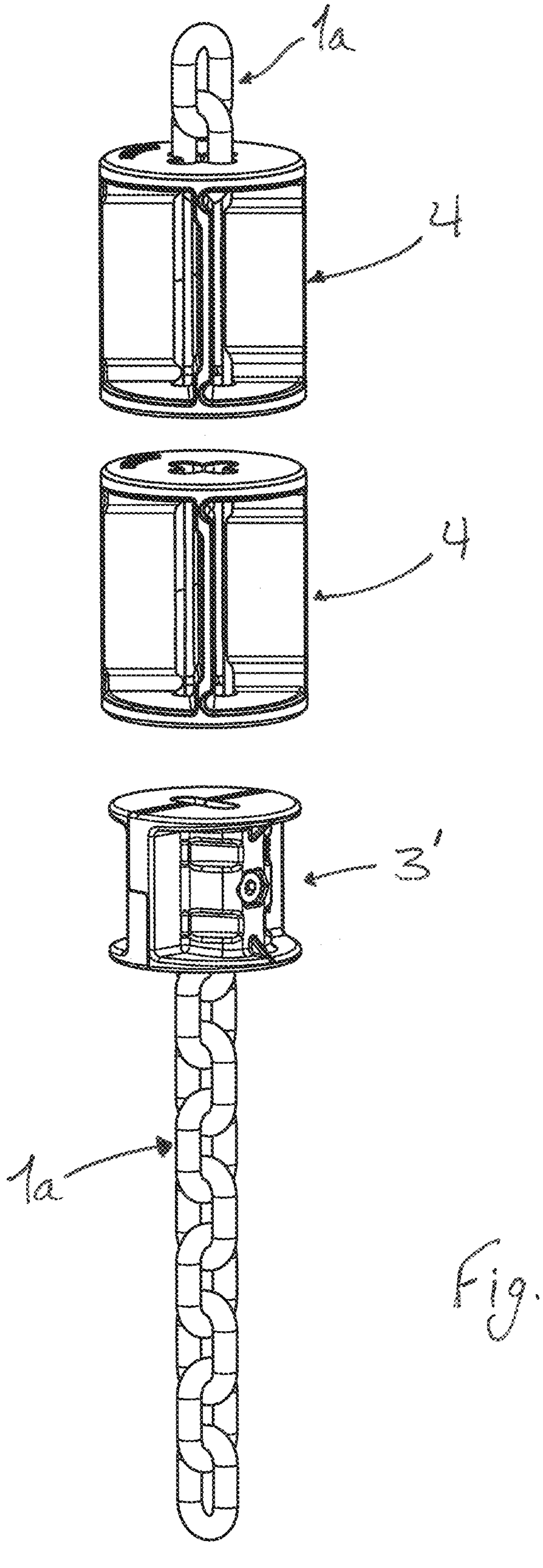
FIG. 7 shows a schematic view of portions of a lifting device including two shut-down buffers arranged in parallel.

Moreover, it will be appreciated that certain advantages may be achieved by arranging two or more shut-down buffers 4 in series, such as shown in FIG. 7 in which two shut-down buffers 4 are arranged in close proximity to each other, above a holding part 3'. In FIG. 7 the chain 1*a* is omitted from the space between the upper and lower shut-down buffers 4 and from between the lower shut-down buffer and the holding part 3'. By arranging two or more shut-down buffers 4 in series, additional after-running movement of the chain 1*a* is possible with lower risk of damage to the shut-down buffers 4 due to over-compression thereof. The use of two or more shut-down buffers 4 in series may also permit for deceleration of a load at the loaded end of the chain over a greater vertical distance, thus reducing peak deceleration of the load once the uppermost shut-down buffer contacts the end switch 5.

In FIGS. 1 and 2, the load hook 2 is raised, but has not yet reached the upper end position and so the shut-down buffer 4 also does not yet lie with its end surface 4*a* (see FIG. 3), which faces the end switch 5, against said end switch and thus is also still in its unloaded and undeformed state.

Figure 3:
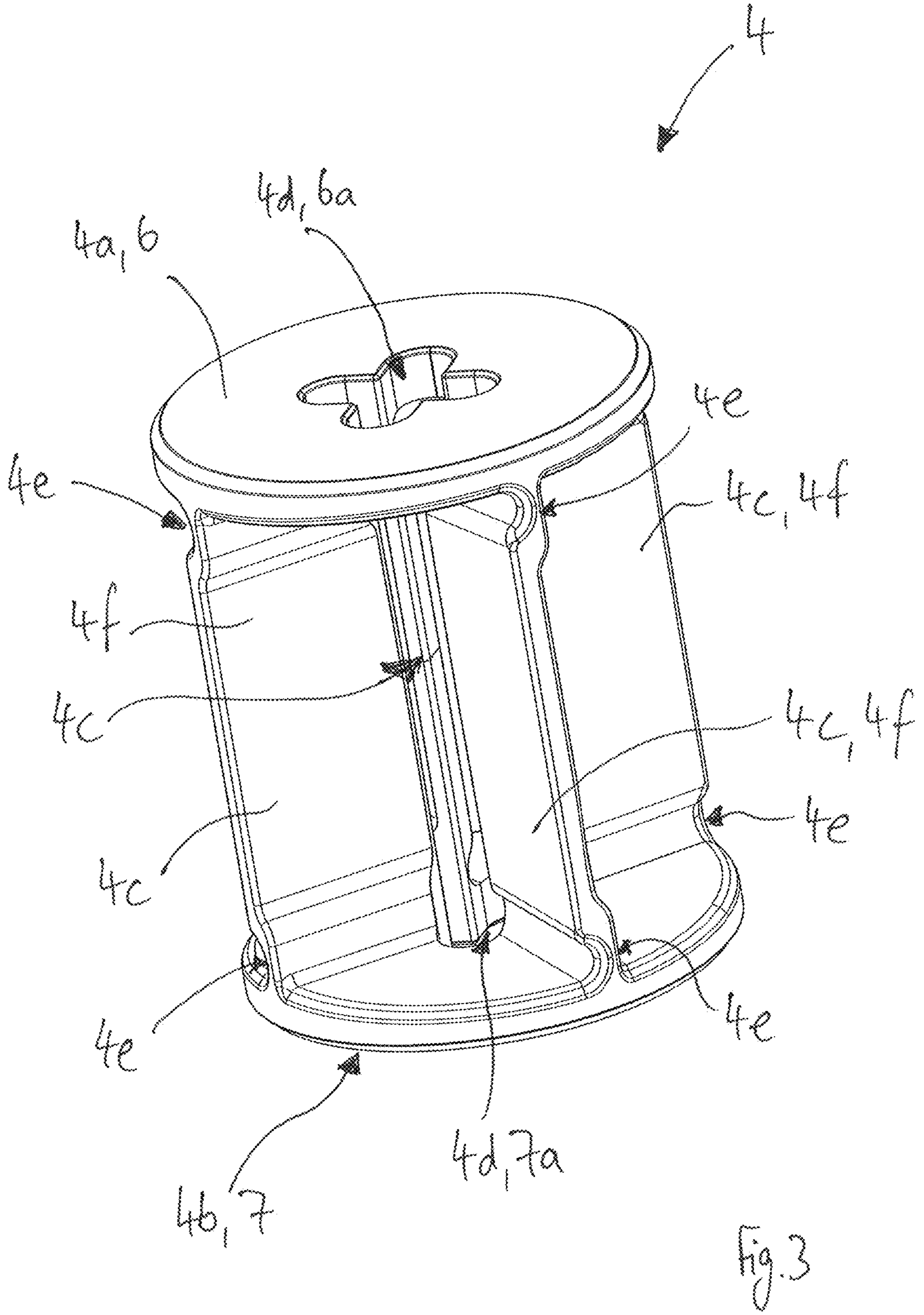
Figure 5:
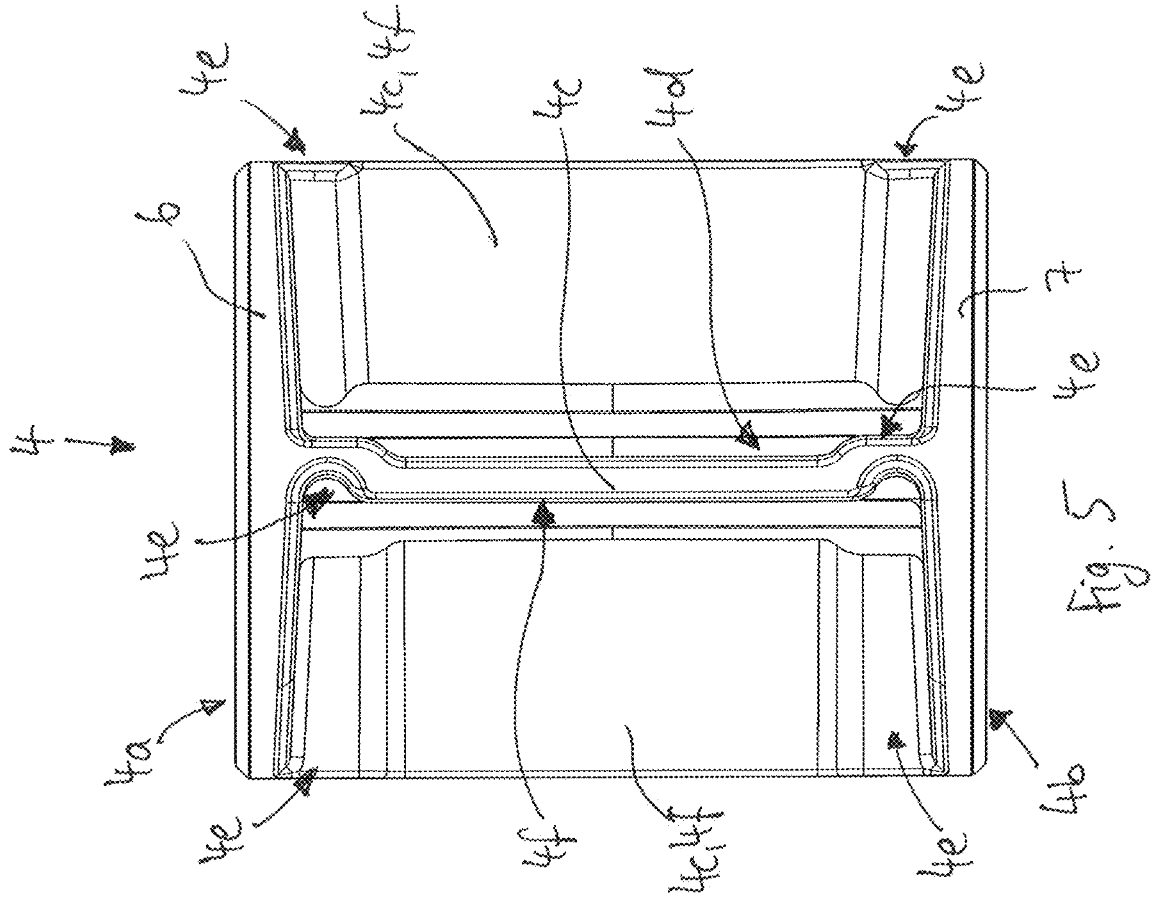
Figure 4:
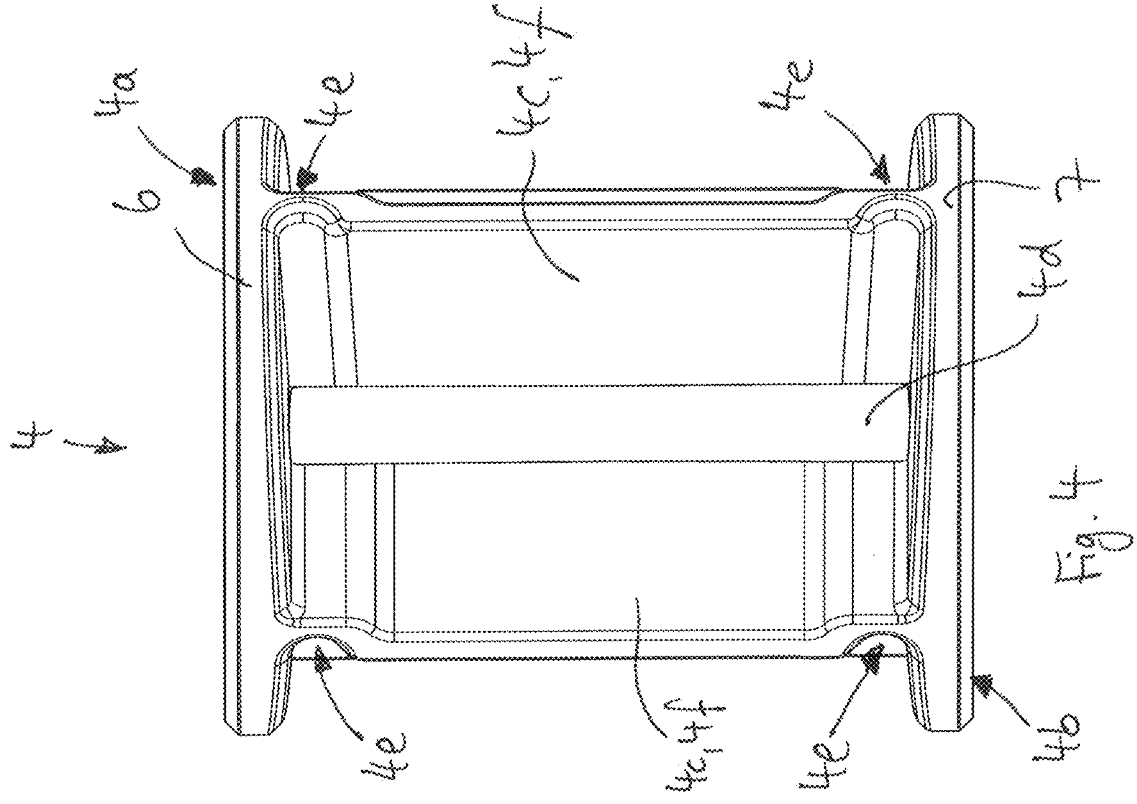

FIGS. 3 to 5 also show different views of the shut-down buffer 4 in its unloaded and undeformed state. FIG. 3 shows a perspective view and FIGS. 4 and 5 show side views of the shut-down buffer 4.

FIG. 3 shows in particular that the shut-down buffer 4 is defined by two opposing and, in particular, planar end surfaces 4*a*, 4*b*, which are oriented at a right angle to the central axis of the shut-down buffer 4, between which extends the through-opening 4*d* for passage of a load-bearing means of the lifting device such as e.g. the chain 1*a*. Furthermore, four mutually spaced web elements 4*c* extend between the end surfaces 4*a*, 4*b* and are disposed in particular around the through-opening 4*d* uniformly spaced apart from each other. Accordingly, the respective neighbouring web elements 4*c* or their rectangular main surfaces 4*f*, which are planar in the illustrated unloaded state, are disposed at a right angle to each other and extend in each case radially and at a right angle to the end surfaces 4*a*, 4*b* in a notional plane which contains or encloses the central axis—lying centrally within the through opening 4*d*—of the shut-down buffer 4. The main surfaces 4*f* extend in parallel and spaced apart from the central axis, whereby, with their radial extent they define the through-opening 4*d* in the direction of the central axis.

The end surfaces 4*a*, 4*b* of the shut-down buffer 4 are each formed by a planar end part 6, 7 with a circular periphery. The end parts 6, 7 are connected to each other and spaced apart from each other by the web elements 4*c*. Furthermore, the web elements 4*c* are connected with their main surfaces 4*f* to both ends parts 6, 7 via a respective attachment region 4*e* which in each case forms a desired flexing point. For this purpose, the attachment region 4*e* engages with the respective end part 6 and 7 in parallel with respect to the main surface 4*f* or the plane of extension thereof and therefore in a laterally offset manner. The attachments—which are laterally offset accordingly—of each web element 4*c* are each oriented to the same side of the main surface 4*f*. By means of the offset attachment of the web elements 4*c*—this attachment being achieved by means of the attachment regions 4*e* which extend through a quarter circle—the intentional lateral bulging or buckling of the respective web element 4*c* opposite to the direction of the offset and therefore to the opposite side of the main surface 4*f* is facilitated (see FIG. 6).

Also illustrated is a first opening 6*a* through which a load-bearing means or element, such as the chain 1*a* in the present case, can enter the through-opening 4*d* and be passed therethrough in order then to be able to exit the shut-down buffer 4 through a second opening 7*a* opposite to the first opening 6*a*. The openings 6*a* and 7*a* are defined by the two end parts 6 and 7 of the shut-down buffer 4 or the associated end surfaces 4*a* and 4*b* of the shut-down buffer 4 and each have a cross-section which corresponds to the geometry of the load-bearing means or element of the lifting device. In the exemplified embodiment of the lifting device as the chain hoist 1, a cruciform cross-section corresponding to the geometry of the chain 1*a* is produced. By means of this embodiment of the openings 6*a*, 7*a*, the shut-down buffer 4 can also serve for chain guidance and disentanglement.

The view of the shut-down buffer in FIG. 4 differs from that in FIG. 5 by an orientation of the shut-down buffer 4 turned by 45° with respect to the central axis. FIG. 4 shows that the shut-down buffer 4 is open between the illustrated end parts 6, 7 and web elements 4*c* as far as the through-opening 4*d*. In FIG. 5 the through-opening 4*d* is partially concealed by a web element 4*c*, the main surface 4*f* of which extends radially away from the central axis and extends perpendicularly to the plane of the drawing. In both FIG. 4 and also FIG. 5 the attachment regions 4*e* can be seen extending as a quarter of a circle, by which extension the lateral offset of the attachment of the web elements 4*c* to the end parts 6, 7 is achieved. In the illustrated orientation—which is vertical in terms of its central axis—of the shut-down buffer 4 and of the main surfaces 4*f* of its web elements 4*c*, the lateral offset corresponds in each case to a horizontal offset.

Figure 6:
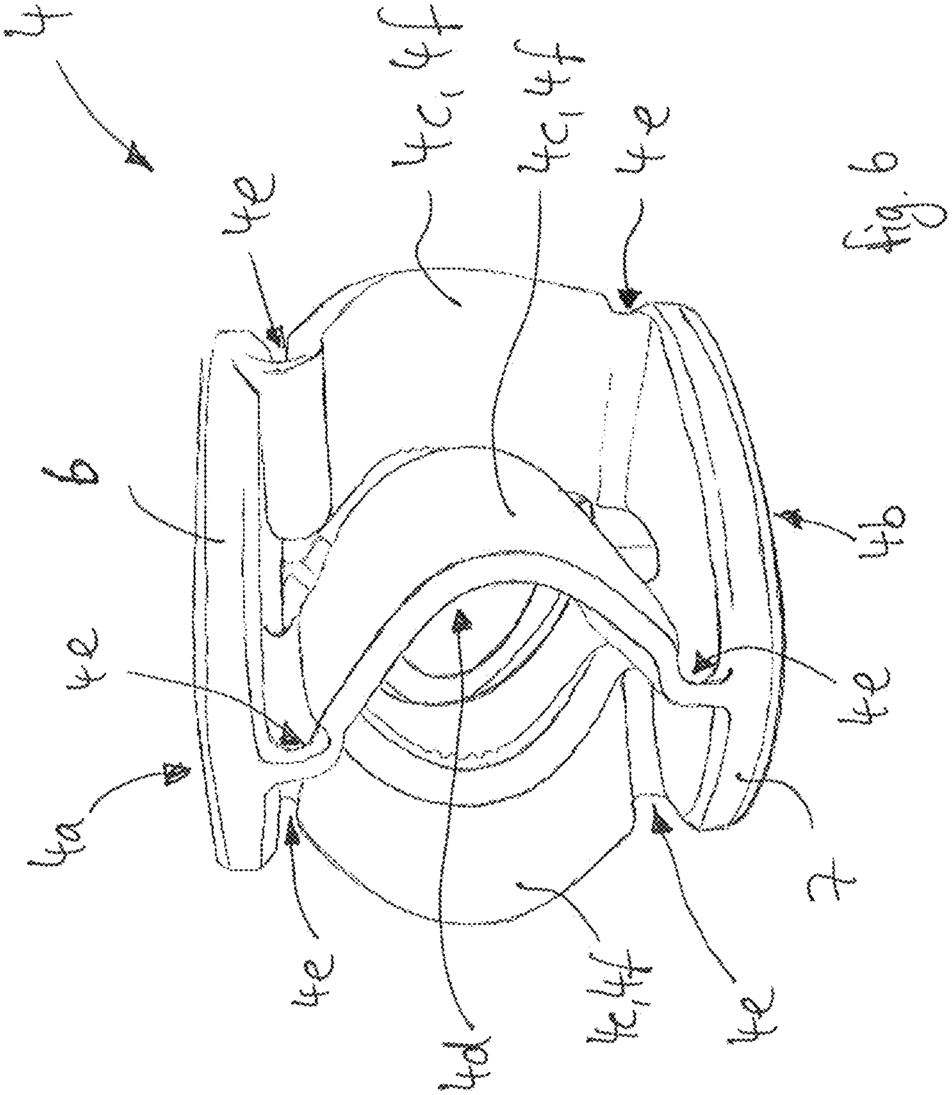
FIG. 6 shows a schematic view of the shut-down buffer in a loaded and deformed state.

FIG. 6 shows the shut-down buffer 4 schematically in the loaded and deformed state which results from the above-mentioned after-running movement when the load hook 2 reaches an end position and the shut-down device is actuated as a result. The shut-down buffer 4 is compressed in the axial direction, i.e. along the central axis of the shut-down buffer 4 by corresponding spring travel with respect to the undeformed state. The end parts 6 and 7 and associated end surfaces 4*a*, 4*b* have thereby moved towards each other by the effected spring travel. The effected spring travel results from the fact that the axial loading causes the web elements 4*c* to bulge in each case opposite to the direction of the lateral offset.

The difference in height thereby produced in the axial direction between the undeformed and the deformed state corresponds to the effected after-running travel of the holding part 3 and of the load hook 2 which these carry out after actuation of the shut-down device by contact of the shut-down buffer 4 against an associated end switch and thereby effected shut-down of the drive motor, until they finally come to a standstill. The end switch can be e.g. the end switch 5 illustrated in FIG. 2 on the underside of the housing 1*b*.

Changes and modifications in the specifically described embodiments may be carried out without departing from the principles of the present invention, which is intended to be limited only by the scope of the appended claims, as interpreted according to the principles of patent law including the doctrine of equivalents.

The invention claimed is:

1. A lifting device comprising:

a drive device;

a shut-down device for the drive device; and a shut-down buffer for actuating the drive device, the shut-down buffer comprising:

first and second opposing end surfaces, between which a through-opening for passage of a load-bearing element of the lifting device extends through the shut-down buffer along a central axis thereof; and at least two mutually spaced web elements extending from and directly coupling the first end surface to the second end surface;

wherein the web elements are configured to resiliently buckle in compression when the shut-down buffer is loaded in the direction of its central axis; and wherein the shut-down buffer is disposed on an upper side of a holding part for a load hook of the lifting device and facing a pulling direction of the lifting device.

2. The lifting device as claimed in claim 1, wherein each web element comprises a respective pair of main surfaces, wherein the web elements extend with their respective main surfaces aligned radially in relation to the central axis of the shut-down buffer, the central axis extending within the through-opening and wherein the web elements extend parallel to the central axis and laterally offset therefrom.

3. The lifting device as claimed in claim 2, wherein each respective web element is connected with its main surface to at least one of the end surfaces via an attachment region that forms a flexing point.

4. The shut-down buffer as claimed in claim 3, wherein said flexing points are configured such that in an unloaded state said main surfaces are laterally offset from said attachment regions.

5. The lifting device as claimed in claim 4, wherein each of the end surfaces is formed by a disc-shaped end part that defines a respective opening with a cross-section that corresponds to a geometry of the load-bearing element of the lifting device.

6. The lifting device as claimed in claim 5, wherein the shut-down buffer, including the end parts and the web elements, is formed as one piece.

7. The shut-down buffer as claimed in claim 5, wherein the shut-down buffer is partially open between the end parts and the web elements and radially inwardly to the through-opening.

8. The lifting device as claimed in claim 1, wherein at least the web elements are made from an elastic material.

9. The lifting device of claim 1, wherein the web elements are substantially planar in an unloaded state and assume an arcuate shape when the shut-down buffer is loaded in the direction of its central axis.

10. The lifting device of claim 1, wherein the holding part is a part of a lower block of the lifting device.

11. The lifting device as claimed in claim 1, wherein the shut-down buffer delivers an actuating force to the shut-down device.

12. The lifting device as claimed in claim 11, wherein the shut-down buffer is disposed between the holding part and a housing of the lifting device in such a way that contact between the holding part and the housing is avoided upon actuation of the shut-down device when the load hook is in an upper end position.

13. The shut-down buffer as claimed in claim 1, wherein each respective web element comprises a flexing point proximate each of said first and second opposing end surfaces, and a main surface disposed between said flexing points, and wherein said flexing points couple to said first and second opposing end surfaces at attachment regions and are shaped so that in an unloaded state said main surfaces are laterally offset from said attachment regions.

14. The shut-down buffer as claimed in claim 13, wherein each of said attachment regions is thinner than said main surface and comprises an arcuate shape in the unloaded state, and wherein said main surfaces are substantially planar in the unloaded state.

* * * * *